(12) United States Patent
Pugh et al.

(10) Patent No.: US 12,154,126 B2
(45) Date of Patent: *Nov. 26, 2024

(54) SYSTEMS AND METHODS TO GENERATE A USER INTERFACE CONVEYING SUBSCRIBER BEHAVIOR OF SUBSCRIBERS WITHIN A MEMBERSHIP PLATFORM

(71) Applicant: PATREON, INC., San Francisco, CA (US)

(72) Inventors: Jennifer Elizabeth Pugh, Oakland, CA (US); Bruno Wong, Roseville, CA (US)

(73) Assignee: PATREON, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,422

(22) Filed: Nov. 28, 2023

(65) Prior Publication Data

US 2024/0095771 A1  Mar. 21, 2024

Related U.S. Application Data

(63) Continuation of application No. 17/554,815, filed on Dec. 17, 2021, now Pat. No. 11,836,756.

(51) Int. Cl.
*G06Q 30/02* (2023.01)
*G06F 9/451* (2018.01)
(Continued)

(52) U.S. Cl.
CPC ......... *G06Q 30/0224* (2013.01); *G06F 9/451* (2018.02); *G06Q 50/01* (2013.01); *G06Q 20/20* (2013.01)

(58) Field of Classification Search
CPC .... G06Q 30/0224; G06Q 50/01; G06F 9/451; G06N 20/00
See application file for complete search history.

(56) References Cited

U.S. PATENT DOCUMENTS

2014/0012755 A1* 1/2014 Walker ............... G06Q 30/0284
705/44
2014/0330621 A1* 11/2014 Nichols .................. G06Q 50/26
705/7.39

(Continued)

FOREIGN PATENT DOCUMENTS

WO 2015191119 A1 12/2015
WO 2015194829 A2 12/2015

OTHER PUBLICATIONS

Heidar Davoudi, Morteza Zihayat, Aijun An, Time-Aware Subscription Prediction Model for User Acquisition in Digital News Media, SIAM, pp. 135-143 (Year: 2017).*

(Continued)

*Primary Examiner* — E Carvalho
(74) *Attorney, Agent, or Firm* — Esplin & Associates, PC

(57) ABSTRACT

Systems and methods are provided to generate a user interface conveying subscriber behavior of subscribers within a membership platform. Exemplary implementations may: obtain subscribership information for content creators of a membership platform, the subscribership information characterizing subscribership of individual subscribers to individual ones of the content creators for individual intervals of time; determine, based on the subscribership information, values of a behavior attribute representing behavior of the individual ones of the subscribers with respect to the individual ones of the content creators for the individual ones of the intervals of time; effectuate presentation of a user interface based on the values of the behavior attribute; and/or perform other operations.

20 Claims, 5 Drawing Sheets

(51) Int. Cl.
  *G06Q 30/0207* (2023.01)
  *G06Q 50/00* (2012.01)
  *G06Q 20/20* (2012.01)

(56) References Cited

U.S. PATENT DOCUMENTS

2016/0292679 A1    10/2016  Kolin
2020/0134696 A1*   4/2020   Lardeux ............. G06Q 30/0254
2020/0219114 A1*   7/2020   Wood ................. G06Q 30/0201

OTHER PUBLICATIONS

Anton Riabov, Zhen Liu, Joel L. Wolf, Philip S. Yu, and Li Zhang, Clustering Algorithms for Content-Based Publication-Subscription Systems, 2002, 22nd International Conference on Distributed Computing Systems (Year: 2002).*

Hissu Hyvarinen, "A Blockchain-Based Approach Towards Overcoming Financial Fraud in Public Sector Services", 2017, Bus Inf System Engineer 59(6), pp. 441-456. (Year: 2017).

* cited by examiner

SYSTEMS AND METHODS TO GENERATE A USER INTERFACE CONVEYING SUBSCRIBER BEHAVIOR OF SUBSCRIBERS WITHIN A MEMBERSHIP PLATFORM

FIELD

The disclosure relates to computer-based management and provision of information characterizing subscribers within a membership platform, in particular, generating a specially configured user interface conveying subscriber behavior of the subscribers within the membership platform.

BACKGROUND

Different platforms may be utilized by entities seeking contributions from the general public to obtain a needed service(s) and/or resource(s). Some of these platforms facilitate raising resources (i.e., funds) from the users through monetary contributions or donations to support a project. Oftentimes content creators may want to target and/or reward subscribers that exhibit a certain type of subscriber behavior.

SUMMARY

An online membership platform may be comprised of users including one or more of content creators, subscribers, and/or other users. Content creators may be users of the membership platform who offer subscribership so that subscribers receive content (also referred to as "benefit items") in exchange for consideration. A "benefit item" may refer to a good and/or service. A good may comprise a physical good and/or a digital good (e.g., "online" content). In some implementations, subscribers may donate funds to a content creator such that the benefit item may be the altruism in supporting the content creator. Subscribers may be users of the membership platform who subscribe, in exchange for consideration at periodic intervals of time (e.g., monthly fee), to one or more content creators. A subscriber of an individual content creator may obtain access to benefit items offered through the membership platform by virtue of being a subscriber to the individual content creator. A subscriber of an individual content creator may obtain preferential access to benefit items offered through the membership platform by virtue of being a subscriber to the individual content creator. Preferential access may refer to subscriber-only access to benefit items and/or other content. Preferential access may refer to tiered levels of access to benefit items and/or other content. Different levels, or tiers, of access may offer different quantities, content types, and/or combinations of benefit items. Different levels may correspond to different amounts of consideration paid by the given subscriber. In some implementations, other users of the membership platform may obtain limited access to benefit items. In some implementations, other users may be non-paying users and/or one-time visitors to the membership platform.

The present disclosure addresses one or more problems of assessing subscriber behavior within an online membership platform. Some problems may include how information is determined and/or compiled into specially configured user interfaces that convey such behavior. Subscriber behavior may include, or convey, a likelihood of continued subscribership by individual subscribers to individual content creators. Content creators may want to target and/or reward subscribers who exhibit certain behavior. Current solutions may require substantial human-machine intervention in order to obtain relevant information managed by software hosted by the server in the provision of the online membership platform. By way of non-limiting illustration, content creators may search through management software and/or multiple user interfaces used to manage their online accounts, and often apply complex search filters to preexisting data to narrow down on whether it looks like a given subscriber is likely to continue subscribership, or not. Accordingly, operators of an online membership platform are tasked with ways to reduce the cost of human-machine intervention by specially configuring one or more user interfaces of the platform to effectively and quickly convey subscriber behavior of subscribers within a membership platform.

One aspect of the present disclosure relates to a system configured to generate a specially configured user interface conveying subscriber behavior of subscribers within an online membership platform. One or more implementations may solve one or more identified problems by implementing computer-based analytics that leverage various pieces of data available (and/or determinable) within the membership platform in order to generate a specially configured and improved user interface that presents information in an informative and understandable way. The user interface may include user interface elements specially configured to provide indications of whether a given subscriber is likely to continue subscribership, or not. Thus, the user interface may present information in a way that allows content creators to take action to maintain their subscribership base. This may include, for example, reaching out personally to subscribers, offering merchandise, offering discounts, and/or other actions. Such indicators were previously unavailable by conventional solutions.

The system may include one or more hardware processors configured by machine-readable instructions and/or other components. The machine-readable instructions may include one or more computer program components. The computer program components may include one or more of an information component, a behavior component, an interface component, and/or other computer program components.

The information component may be configured to obtain subscribership information for content creators of a membership platform. The content creators may offer subscribership within an online membership platform. The content creators may offer the subscribership in exchange for consideration at periodic intervals of time. Subscribers, in turn, may receive benefit items on a reoccurring basis. The subscribership information may characterize subscribership of individual ones of the subscribers to individual ones of the content creators for individual ones of the intervals of time. By way of non-limiting illustration, first subscribership information may characterize the subscribership of a first subscriber to a first content creator for individual ones of the intervals of time.

The behavior component may be configured to determine values of a behavior attribute and/or other information. The determination may be based on the subscribership information and/or other information. The values of the behavior attribute may represent behavior of the individual ones of the subscribers with respect to the individual ones of the content creators for the individual ones of the intervals of time. The behavior may be characterized by likelihood of continued subscribership. By way of non-limiting illustration, a first value of the behavior attribute may be determined for the first subscriber. The first value of the behavior attribute may represent the behavior of the first subscriber with respect to the first content creator during a first interval of time. A second value of the behavior attribute may be determined for the first subscriber. The second value of the behavior attribute may represent the behavior of the first subscriber with respect to the first content creator during a second interval of time.

The interface component may be configured to effectuate presentation of a user interface on individual computing platforms associated with the individual ones of the content creators. The presentation of the user interface may be based on the values of the behavior attribute and/or other information. The user interface may provide visual representations of the behavior of the individual ones of the subscribers with respect to the individual ones of the content creators for the individual ones of the intervals of time.

By way of non-limiting illustration, the user interface may be presented on a first computing platform. The first computing platform may be associated with the first content creator. The user interface may display a first visual representation of the behavior of the first subscriber with respect to the first content creator during the first interval of time as represented by the first value. The user interface may display a second visual representation of the behavior of the first subscriber with respect to the first content creator during the second interval of time as represented by the second value.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Some entities may seek to obtain funds through subscriptions. Such entities may utilize online membership platforms that allow consumers to sign up for ongoing payments in exchange for rewards and/or other membership benefits. Entities seeking funding may be content creators, for example, artists, musicians, educators, speakers, etc. Content creators may create content, which may refer to one or more of information, experiences, products, and/or other content provided to an audience or end-user, whether it be digital, analog, virtual, and/or other form. For example, types of content may include but is not limited to online content such as video content, podcasts, photographic art, webcomics, do-it-yourself crafts, digital music, performance art, and/or other types of content. Content creators may utilize membership platforms that allow consumers to become subscribers of the content creator. As subscribers, consumers may contribute or donate money to a content creator at periodic intervals of time (e.g., weekly or monthly) and/or per piece of content created by the content creator. Content creators may interact with subscribers and/or prospective subscribers (e.g., consumers that show interest in the content created by content creators) in a variety of ways.

Figure 1:
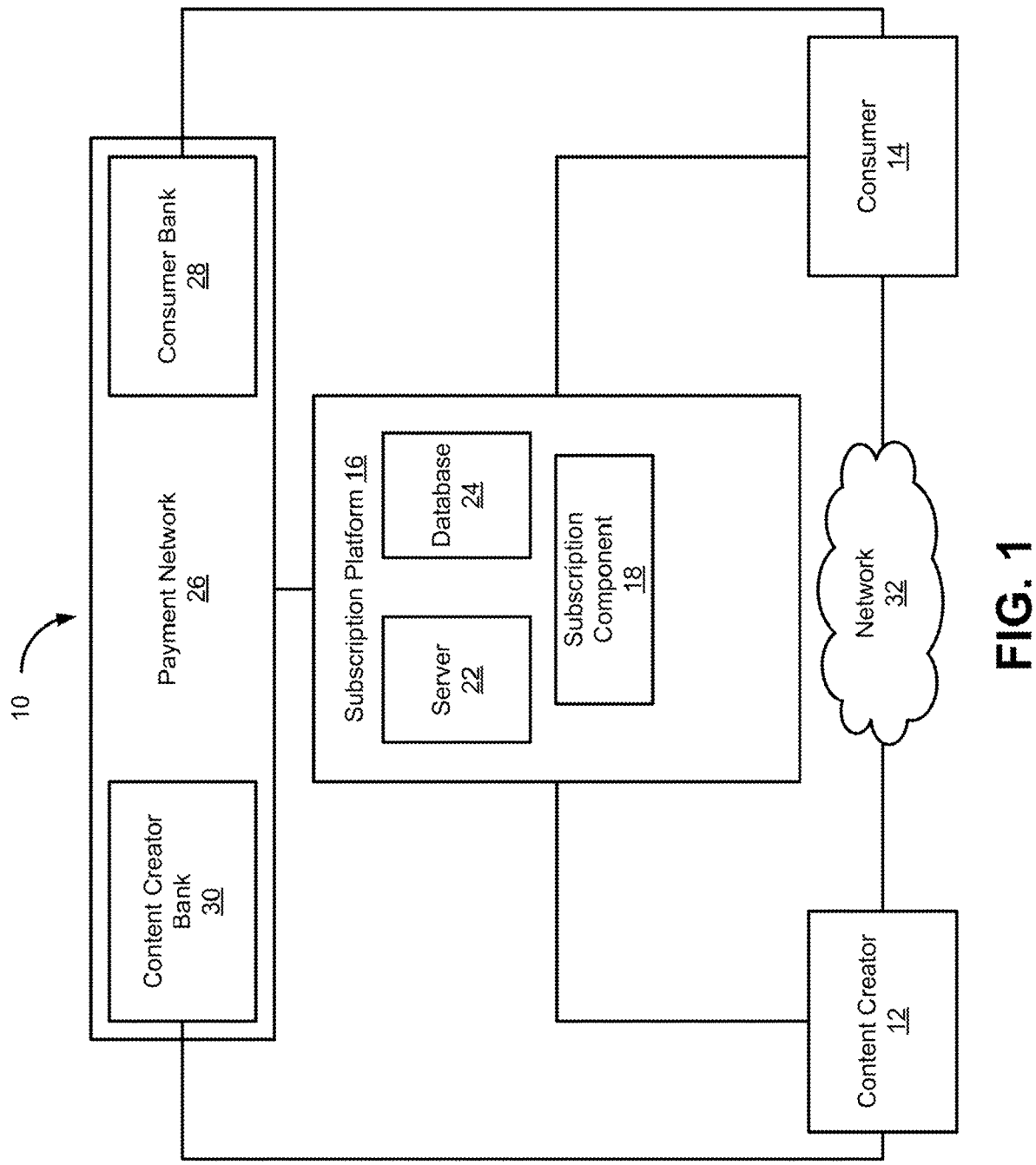
FIG. 1 illustrates an example membership system.

FIG. 1 illustrates an example subscriber-based membership system 10 (sometimes referred to herein as a "membership platform"). A content creator 12 may register and set up a creator account with subscription platform 16. Content creator 12 may create a page on a website or mobile app hosted by server 22 of subscription platform 16 and input relevant information. Content creator 12 may input information associated with and/or relevant to content creator 12 via subscription component 18, such as content information, subscription level information specifying desired and/or initial subscription levels, preferred revenue source information (e.g., preferred currency, currency source, and/or other information), and/or other information. A page created by content creator 12 may be built using such information to make potential consumers aware of how content creator 12 may wish to be supported/receive support for his/her content creation in addition to subscribership revenue. Content creator 12 may set up a content creator account with subscription platform 16 through subscription component 18 or another appropriate component allowing content creator 12 to register with subscription platform 16. Various types of information regarding content creator 12 may be input into subscription platform 16, some of which may be information identifying content creator 12.

Consumer 14 (also referred to as a "subscriber") may set up a subscriber account with subscription platform 16. In setting up the subscriber account, consumer 14 may input subscriber information. The subscriber information may include one or more of demographic information, identifying information, and/or other information. The demographic information relevant to consumer 14 may include one or more of age, income, job, location, and/or other information. Identifying information may include one or more of name, a picture, a phone number, username, and/or other information. Through the page created by content creator 12, a consumer 14 may pledge to donate a given amount of money to content creator 12 every time content creator 12 creates content and/or at periodic intervals of time. For example, if content creator 12 is an artist, consumer 14 may pledge to donate ten dollars each time content creator 12 creates a piece of art.

In order to remit payment to content creator 12, consumer 14 may set up a payment mechanism through subscription platform 16 as part of setting up his/her subscriber account. When subscription platform 16 is notified or determines that content creator 12 has created content, subscription platform 16 may access payment network 26 to obtain and/or transfer the pledged amount from consumer bank 28 to content creator bank 30. It is noted that although the term "bank" is used, these components may comprise one or more of banking information, credit and/or debit card information, accounts through which payments can be made, and/or other entities beyond a traditional "bank." Alternatively (or in addition to per content pledge donations), consumer 14 may pledge to donate a given amount to content creator 12 at periodic intervals of time through subscription platform 16. For example, consumer 14 may pledge to donate five dollars each month to content creator 12, where each month, subscription platform 16 may access payment network 26 to obtain and transfer the pledged amount from consumer bank 28 to content creator bank 30. It should be understood that consumer 14 may have an established relationship with consumer bank 28, and that content creator 12 may have an established relationship with content creator bank 30. It should be noted that subscription platform 16 may retain a portion, such as some percentage, of the pledged amount, as a fee for hosting the page created by content creator 12, providing payment services, etc.

As consideration for the pledged donations, content creator 12 may provide some type of preferential access to consumer 14 in the form of benefit items including online content, physical content, and/or other content. Content creator 12 may specify tiers of preferential access based upon the amount of money consumer 14 pledges to donate and/or depending on whether the pledged donation is a recurring donation or a per content donation. The amounts and/or types of pledged donations that may be made by consumer 14 to back content creator 12 may be referred to as subscription levels.

For example, in return for a monthly, recurring dollar amount of donation, content creator 12 may provide a high-resolution digital image of the artwork created during that month to consumer 14. In exchange for a weekly, recurring dollar amount of donation, content creator 12 may provide a high-resolution digital image of the artwork created during that month as well as a time-lapse video of content creator 12 creating the artwork. In exchange for another dollar amount per content donation, content creator 12 may provide a low-resolution digital image of the artwork. For another dollar amount per content donation, content creator 12 may engage in a live webchat or live meet-and-greet with consumer 14. Various types of preferential access may be provided by content creator 12 to consumer 14, and content creator 12 may specify the subscription level to preferential access correlation.

The preferential access may be provided to consumer 14 from content creator 12. For example, content creator 12 may email digital copies of artwork to consumer 14 over a communications network, such as a local area network (LAN), a wide area network (WAN), a wireless network (e.g., WiFi), a mobile communication network, a satellite network, the Internet, fiber optic, coaxial cable, infrared, radio frequency (RF) or any other suitable network. The preferential access may be provided to consumer 14 from content creator 12 via subscription platform 16. For example, the live webchat between content creator 12 and consumer 14 may be provided through some chat functionality of the page of content creator 12 hosted on server 22 of subscription platform 16, which may reside on communications network 32 or on another network (not shown).

It should be noted that not all subscription levels are necessarily associated with preferential access. Some consumers may be driven to subscribe to content creator 12 on the basis of created content rather than any special perks or rewards.

The specification and management of subscriptions on behalf of content creator 12 may be handled by subscription component 18 alone or in conjunction with database 24. For example, a user interface may be provided via subscription component 18 allowing content creator 12 to specify his/her desired subscription levels and corresponding preferential access, as well as his/her preferred sources of revenue. Subscription component 18 may receive the information input by content creator 12 and transmit the information for storage as one or more records, matrices, and/or other data structures in database 24 and/or within memory local to subscription component 18. Database 24 or the local memory of subscription component 18 may be configured in a suitable database configuration, such as a relational database, a structured query language (SQL) database, a distributed database, an object database, etc. Suitable configurations and database storage types will be apparent to persons having skill in the relevant art.

Content creator 12 may be associated with one or more of subscribership information, content information, creator profile information, and/or other information. The content creator 12 may be able to change (e.g., add, delete, update, modify, etc.) such information. Such changes may be input via subscription component 18 and reflected in its local memory and/or database 24. It should be understood that content creator 12 and/or consumer 14 may be an individual or some entity representative of an individual or group of individuals.

Content information may characterize benefit items that content creator 12 creates. The content information may include information defining and/or describing one or more of the type of benefit items, the medium in which the benefit items is created and/or presented, the amount of benefit items created, and/or the frequency at which the benefit items are created. For example, type of benefit items and/or medium may indicate that content creator 12 creates paintings on canvas, develops video games for a mobile platform, performs in online musical performances, and/or other information. Amount may reflect that content creator 12 created a series of artwork comprising four paintings. Content frequency information may indicate that content creator 12 develops three video games over the course of six months. Such information may be stored in content database 24.

In some implementations, the subscribership information may characterize the subscribership of the individual subscribers to individual content creators. In some implementations, subscribership information may characterize an individual subscriber's activity with respect to an individual content creator, an individual subscriber's engagement with an individual content creator and/or engagement with the individual content creator's content, and/or other information. The subscribership information may include one or more of length of subscribership of the individual subscribers to individual content creators, date of initial subscribership of the individual subscribers to individual content creators, a subscription level of the individual subscribers, rank among other subscribers to individual content creators, lifetime contribution amount of the individual subscribers, identifying information of the individual subscribers, subscriber-initiated interactions, payment status, a payment source status, a cancelation workflow status, a subscribership tier status, and/or other information.

The identifying information of the individual subscribers may include one or more of name, username, demographics, email, and/or other information identifying an individual subscriber.

The subscriber-initiated interactions may be characterized based on one or more of content of the interactions, form of the interactions, point in time of the interactions, and/or other information. The content of the interactions may include what was communicated. The form of interactions may indicate how the communication was made. By way of non-limiting illustration, communication may be made by one or more of chat, comments, posting on forum or message board, phone call, video chat, and/or other forms of communication.

In some implementations, the subscribership information may include the payment status. The payment status may characterize whether consideration has been paid by the individual ones of the subscribers for the individual ones of the intervals of time. By way of non-limiting example, for an individual interval of time, an individual subscriber's payment status may indicate that the subscriber has initiated payment and/or that payment has been successful processed (e.g., by a payment processing entity) for an interval of time. For an individual interval of time, an individual subscriber's payment status may indicate that the subscriber has initiated payment but that the payment was unsuccessfully processed. Payments that are unable to be processed may be caused by one or more of subscriber error, payment processing entity error and/or rejection, and/or other factors intended and/or unintended. For an individual interval of time, an individual subscriber's payment status may indicate that the user has not initiated payment and/or has initiated a cancellation of subscribership. In some implementations, lack of payment and/or cancellation of subscribership may effectuate a denial of benefit items and/or other content from the content creators to the individual subscriber.

In some implementations, the subscribership information may include the payment source status. The payment source status may characterize whether a source to withdraw the consideration is accessible. By way of non-limiting illustration, an individual subscriber's payment source status may indicate that the individual subscriber has a saved payment method associated with the subscribership (e.g., via consumer bank 28 of FIG. 1). The subscriber may authorize that consideration be paid using the saved payment method for individual intervals of time. By way of non-limiting illustration, an individual subscriber's payment source status may indicate that one or more payment methods have been saved and/or associated with the subscribership to an individual content creator and/or the membership platform as a whole. By way of non-limiting illustration, an individual subscriber's payment source status may indicate that no payment method has been saved.

In some implementations, the subscribership information may include the cancelation workflow status. The cancelation workflow status may characterize whether the individual ones of the subscribers have initiated a cancelation of the subscribership to the individual ones of the content creators. By way of non-limiting example, initiation of cancelation of the subscribership may be caused by one or more of the subscriber selecting to cancel the subscribership, the subscriber failing to initiate payment for one or more intervals of time, and/or other activity.

In some implementations, the subscribership information may include the subscribership tier status. The subscribership tier status may characterize tier of the subscribership of the individual ones of the subscribers to the individual ones of the content creators and/or change in the tier of the subscribership. By way of non-limiting example, subscribership tier status may indicate whether a subscriber belongs to a tier of subscribership to an individual content creator. Different tiers may require more consideration for an interval of time. In some implementations, subscribership tier status may indicate a subscriber has changed from one tier to another, and/or has initiated a change from one tier to another. The subscribership tier status may indicate whether the change was to a higher tier (corresponding to more payment), or a lower tier (corresponding to lower payment).

Apart from providing preferential access to consumer 14, content creator 12 may engage with consumer 14 by interacting in a variety of ways. For example, content creator 12 may communicate with consumer 14 over email, one or more social media platforms, a messaging platform or other appropriate communication mechanisms or methods. It should be understood that such communication platforms or mechanisms may be embodied in communications network 32 allowing content creator 12 and consumer 14 to communicate outside of subscription platform 16. It should be understood that communication platforms or mechanisms may operate in conjunction with subscription platform 16 such that one or more of their respective functionalities may be utilized through subscription platform 16. For example, social media hyperlinks allowing information from content creator 12's page may be provided on the webpage allowing content creator 12 to share content creation progress updates with consumer 14. For example, content creator 12 may respond to a communication from consumer 14 posted on a comment section provided on content creator 12's page in a private message or as part of the comment thread. It should be noted that content creator 12 may engage a single consumer, e.g., consumer 14, one-on-one and/or may engage a group of consumers. For example, content creator 12 may post a "public" comment on his/her webpage that may be seen by any consumer that is a subscriber to content creator 12 and/or any consumer that may be a potential subscriber.

Figure 2:
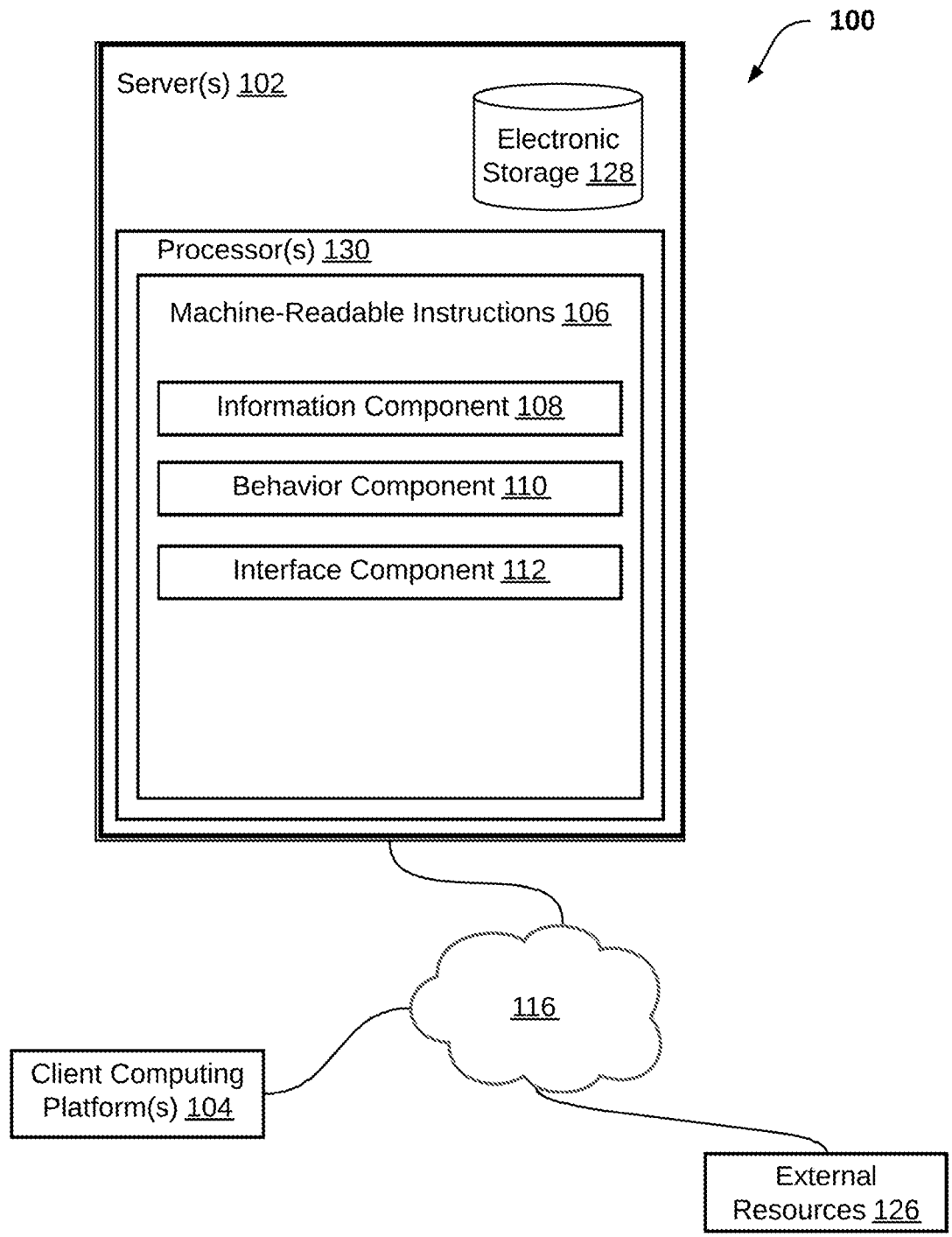
FIG. 2 illustrates a system configured to generate a user interface conveying subscriber behavior of subscribers within a membership platform, in accordance with one or more implementations.

FIG. 2 illustrates a system 100 configured to generate a user interface conveying subscriber behavior of subscribers within a membership platform. In some implementations, system 100 may include one or more of server(s) 102, client computing platform(s) 104, and/or other components. The terms remote computing platform, client computing platform, and/or computing platform may be used interchangeably herein to refer to individual ones of the client computing platform(s) 104. Server(s) 102 may be configured to communicate with one or more client computing platforms 104 according to a client/server architecture and/or other architectures via one or more network(s) 116. In some implementations, one or more network(s) 116 may include the Internet and/or other networks. Client computing platform(s) 104 may be configured to communicate with other computing platforms via server(s) 102 and/or according to a peer-to-peer architecture, a client-server architecture, and/or other architectures. Users may access system 100 via client computing platform(s) 104.

It is noted the system 100 of FIG. 2 may be the same as, or included as part of, the system 10 shown in FIG. 1. For example, the server(s) 102 may be the same as or included in server 22. Network(s) 116 may be the same as or included in network 32. Individual computing platforms of one or more client computing platforms 104 may be computing platforms utilized by content creator 12 and/or consumer 14 to access system 10 and/or system 100. Non-transitory electronic storage 128 may be the same as or included in database 24. Accordingly, those skilled in the art will recognize that although system 10 and system 100 are shown and described separately, they may comprise a single common system. However, in some implementations, the features and/or functionality of system 100 may be provided remotely as a separate system from system 10.

Server(s) 102 may be configured by machine-readable instructions 106. Machine-readable instructions 106 may include one or more computer program components. The computer program components may include one or more of an information component 108, a behavior component 110, an interface component 112, and/or other computer program components.

Information component 108 may be configured to obtain subscribership information for content creators of a membership platform and/or other information. The content creators may offer subscribership and/or other content to consumers. Subscribers, in return, may receive benefit items. The content creators may provide benefit items to the subscribers at different levels of subscribership in exchange for different amounts of consideration paid at periodic intervals of time. An individual interval of time may have a duration of one or more of one week, two weeks, one month, six months, one year, and/or other durations. The subscribership information may characterize subscribership of individual ones of the subscribers to individual ones of the content creators for individual ones of the intervals of time. By way of non-limiting illustration, first subscribership information may characterize the subscribership of a first subscriber to a first content creator for individual ones of the intervals of time.

Behavior component 110 may be configured to determine behavior information including values of a behavior attribute and/or other information. The determination may be based on the subscribership information and/or other information. The values of the behavior attribute may represent behavior of the individual ones of the subscribers with respect to the individual ones of the content creators for the individual ones of the intervals of time. By way of non-limiting illustration, a first value of the behavior attribute may be determined for the first subscriber. The first value of the behavior attribute may represent the behavior of the first subscriber with respect to the first content creator during a first interval of time. A second value of the behavior attribute may be determined for the first subscriber. The second value of the behavior attribute may represent the behavior of the first subscriber with respect to the first content creator during a second interval of time.

In some implementations, the behavior attribute may characterize a likelihood of continued subscribership to an individual content creator for an individual subscriber and/or other likelihood of other activity. In some implementations, values of the behavior attribute for an individual subscriber may be determined by the subscriber's subscribership information and/or other information. An individual value may be determined for an individual interval of time. An individual value may be expressed qualitatively and/or quantitatively. A quantitative value may comprise a numerical value represented within a value range. For example, a value range may be from 1 to 10 (or other range), where 1 may represent little or no likelihood, 10 may represent highest likelihood, and values in between may represent varying measures of likelihood of continued subscribership. By way of non-limiting illustration, a qualitative value may comprise a description of likelihood of continued subscribership. For example, description of likelihood of continued subscribership may include one or more of "not likely to continue subscribership," "at risk of discontinuing subscribership," "moderately likely to continue subscribership," "high likelihood of continued subscribership," "very likely to continue subscribership," and/or other descriptions. It is noted that the above examples of values of the behavior attribute are provided for illustrative purpose only and are not to be considered limiting. Instead, one skilled in the art may recognize other ways in which likelihood of continued subscribership may be expressed.

In some implementations, a given value of the behavior attribute may be determined by one or more of payment status, payment source status, cancelation workflow status, subscribership tier status, and/or other information.

In some implementations, individually the payment status, payment source status, cancelation workflow status, subscribership tier status, and/or other information may provide intuitive and/or straight forward determination of likelihood of continued subscribership (e.g., a one-to-one relationship). By way of non-limiting illustration, if a payment has been made for an interval of time, it may be likely that the subscriber is going to continue subscribership. Alternatively, if a payment has been cancelled for an interval of time, it may be unlikely that the subscriber is going to continue subscribership. If a subscribership tier has increased, it may be very likely that the subscriber is going to continue subscribership. If a subscribership tier has decreased, it may also be likely that the subscriber is going to continue subscribership, however it may be less likely than if the subscribership tier had increased. For example, if cancelation workflow has been initiated during an interval of time, it may be very likely that the subscriber is not going to continue subscribership. Alternatively, if no cancellation workflow has been initiated, it may be likely that the subscriber is going to continue subscribership.

By way of non-limiting illustration, a first value of the behavior attribute in a first interval of time may indicate that an individual subscriber has a high likelihood of continued subscribership. A second value of the behavior attribute in a second interval of time may indicate that the individual subscriber has a moderate likelihood of continued subscribership. A third value of the behavior attribute in a third interval of time may indicate that the individual subscriber has a low likelihood of continued subscribership.

In some implementations, combinations of subscribership information may be used to determine the value of the behavior attribute for an individual subscriber. For example, the value of the behavior attribute may be determined based on two or more of payment status, payment source status, cancelation workflow status, subscribership tier status, and/or other information, and/or other combinations of subscribership information. In some implementations, determining the value of the behavior attribute based on two or more pieces of information may be based on aggregating individual values determined for the pieces of information individually. Aggregating may include one or more of adding, averaging, and/or other calculations.

In some implementations, individual pieces of information in the subscribership information may be weighted. In some implementations, weighting may affect the aggregation. By way of non-limiting illustration, a piece of information may be more heavily and/or be considered more important in the determination of the value of the behavior attribute based on multiple pieces of information. By way of non-limiting illustration, a subscriber's subscribership tier status for an individual interval of time may indicate that the subscriber changed to a higher tier of subscription. This subscribership tier status may correlate to a relatively higher likelihood of continued subscribership. A subscriber's cancelation workflow status for that interval of time may indicate that the subscriber has initiated cancelation of subscribership. This cancelation workflow status may correlate to a low likelihood of continued subscribership. In some implementations, cancelation workflow status may be more heavily weighted than the subscribership tier status in the determination of the value of the behavior attribute for an interval of time. Accordingly, in aggregating individual values to determine a value of the behavior attribute, the cancelation workflow status may outweigh the increase in tier. In this example, the value of the behavior attribute, when considering the increase in tier but initiation of cancelation workflow and weighting, may convey a moderate to low likelihood of continued subscribership. In some implementations, weights may be applied in an aggregation calculation as fractional values. By way of non-limiting illustration, weights may be expressed as values within a sliding scale in a range of zero to one. Zero may convey a lowest weight; one may convey a highest weight; and decimal values therebetween may convey various degrees of weighting an individual value. By way of non-limiting illustration, zero may convey no consideration of weight; 0.25 may convey a low weight; 0.5 may convey a neutral weight; 0.75 may convey a moderate weight; and 1.0 may convey a full consideration of weight. In some implementations, operators of the membership platform may dictate the weights to be applied to individual pieces of information. Operators may change the weight as needed to adjust impact of certain pieces of information, as factors may be deemed more or less important as others as time goes on.

In some implementations, behavior component 110 may utilize machine learning in order to dynamically determine weights that should be applied to individual pieces of information. By way of non-limiting illustration, behavior component 110 may compile behavior information, subscribership information, and/or other info into input/output pairs for training a machine learning model. The input/output pairs may include training input information and training output information. The training input information for an individual input/output pair including the behavior information for an individual subscriber over time. The training output information for the individual input/output pair may include indications of whether the individual subscriber is currently subscribed to a given content creator. The behavior component 110 may be configured to train a machine learning model based on the input/output pairs to generate a trained machine learning model. The trained machine learning model being configured to determine impact of different behaviors of the subscriber that lead to continued and/or discontinued subscribership. Based on the determining the impact, the trained machine learning model being configured to what weights should be applied to different pieces of information when generating an aggregate. Further, the trained model may be continually fed up to date information so that learning is continuous, and the model is adaptable and able to be improved in an ongoing basis.

It is noted that the above descriptions of weighting are provided for illustrative purposes only and is not to be considered limiting. Instead, those skilled in the art that may appreciate how weighting may be applied to adjust and/or tip the scale on an aggregation of values and/or which pieces of information may be weighted relatively more than others.

Interface component 112 may be configured to effectuate presentation of a user interface on individual computing platforms associated with the individual ones of the content creators. The presentation of the user interface may be based on the values of the behavior attribute and/or other information. The user interface may provide visual representations of the behavior of the individual ones of the subscribers with respect to the individual ones of the content creators for the individual ones of the intervals of time.

In some implementations, the user interface may display sequences of interface elements as the visual representations of the behavior over a sequence of the intervals of time. An individual sequence may correspond to the behavior of an individual subscriber with respect to an individual content creator over a sequence of intervals of time. Individual ones of the interface elements in the sequences may correspond to the individual ones of the intervals of time. Individual ones of the interface elements in the sequences may correspond to the individual ones of values of the behavior parameter. The display of the sequences of interface elements for individual subscribers to a content creator may allow the content creator to quickly discern whether or not the subscriber is at risk of discontinuing subscribership. Since the behavior may be shown over multiple intervals of time, the content creator may be able to understand behavior of their subscribers. For example, a content creator may learn that a subscriber may often have issues with processing payments, but their behavior over time shows they continue subscribership. Accordingly, the content creator may not need to take drastic action if a payment processing issue happens with that subscriber over one interval, as their behavior shows they typically correct this. Other insights may be drawn from the user interface. The content creator may choose to take further actions, such as one or more of sending rewards to users showing high likelihood (or other measure) of continued subscribership, sending personal communications, and/or other actions.

In some implementations, interface component 112 may be configured to determine visual representations of the behavior for the interface elements by determining a display characteristic of the individual ones of the interface elements based on the values of the behavior attribute. Interface elements may include graphics comprising one or more of letters, numbers, symbols, and/or other graphics. The display characteristics may include one or more of color, size, shape, indicia, and/or other features.

In some implementations, individual values and/or ranges of values of the behavior attribute may correspond to individual visual representations. By way of non-limiting illustration, a given value may correspond to a given display characteristic of a given graphic. In some implementations, a range of values may correspond to a given display characteristic of a given graphic. In some implementations, a display characteristic may help to visually convey the measure of likelihood of continued subscribership. By way of non-limiting illustration, a first color may be designated as the color that conveys high likelihood. A second color may be designated as the color that conveys low likelihood. A third color may be designated as the color that conveys moderate likelihood. By way of non-limiting illustration, a first shape may be designated as the shape that conveys high likelihood. A second shape may be designated as the shape that conveys low likelihood. A third shape may be designated as the shape that conveys moderate likelihood. By way of non-limiting illustration, a first size of a graphic may be designated as the size that conveys high likelihood. A second size of a graphic may be designated as the size that conveys low likelihood. A third size of a graphic may be designated as the size that conveys moderate likelihood.

By way of non-limiting illustration, the user interface may be presented on a first computing platform. The first computing platform may be associated with the first content creator. The user interface may display a first visual representation of the behavior of the first subscriber with respect to the first content creator during the first interval of time as represented by the first value. The user interface may display a second visual representation of the behavior of the first subscriber with respect to the first content creator during the second interval of time as represented by the second value.

By way of non-limiting illustration, the user interface presented on the first computing platform may display a first sequence including a first interface element corresponding to the first interval of time and a second interface element corresponding to the second interval of time. The first interface element may comprise the first visual representation, and the second interface element may comprise the second visual representation. The first interface element may have a first display characteristic based on the first value. The second interface element may have a second display characteristic based on the second value. The first interface element may be a green circle and/or other shapes and/or symbols. The first interface element may indicate that for the first interval of time the first subscriber had a high likelihood of continued subscribership. The second interface element may be a yellow circle and/or other shapes and/or symbols. The yellow circle may indicate that for the second interval of time the first subscriber had a moderate likelihood of continued subscribership. The sequence of interface element may provide insights to the first content creator about the first subscriber's behavior over time.

In some implementations, the user interface may be part of management software and/or a management interface used by content creators to manage their account. The user interface may be accessible via the membership platform and/or as an external resource.

In some implementations, the user interface may include a grid of cells arranged in attribute-name columns and rows of cells specifying individual values of corresponding attributes names in the attribute-named columns. The attributes may include one or more of the behavior attribute described herein, and/or one or more other attributes characterizing subscribers and/or their subscribership to individual content creators. Other attributes may correspond to other information included the subscribership information. By way of non-limiting illustration, an attribute may include a username attribute, an email attribute, a lifetime contribution attribute, a tier attribute, and/or other information.

Figure 5:
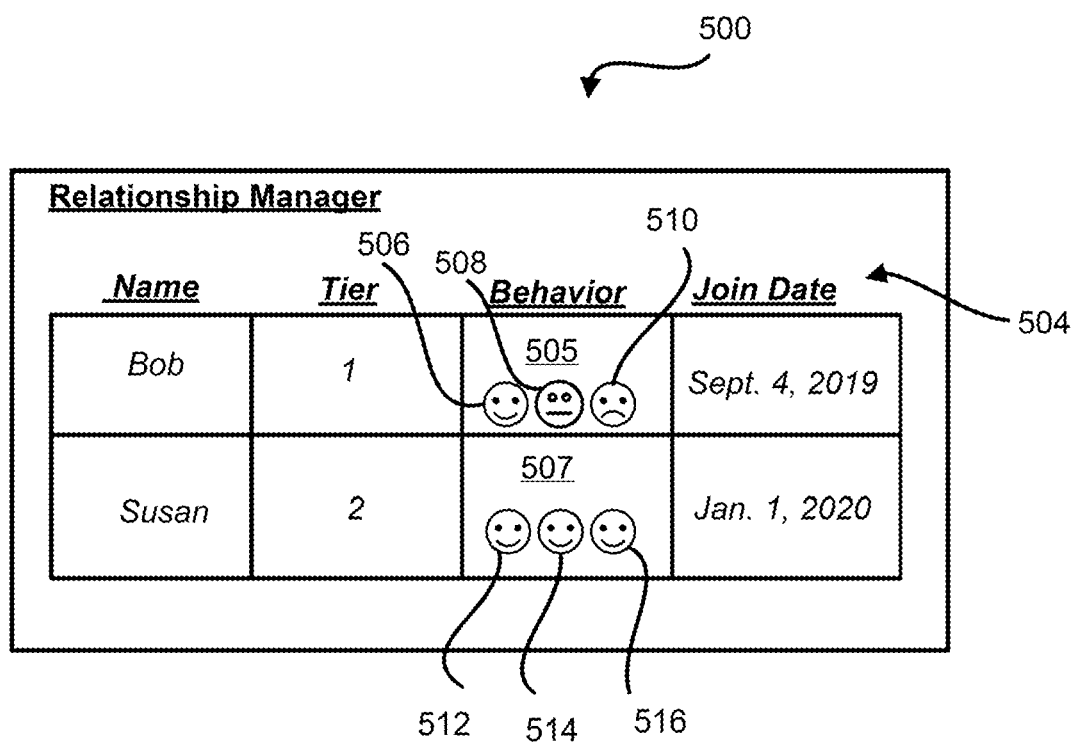
FIG. 5 illustrated a user interface, in accordance with one or more implementations.

FIG. 5 illustrates a user interface 500 conveying subscriber behavior of subscribers within a membership platform, in accordance with one or more implementations. The user interface 500 may be configured to provide visual representations of behavior of subscribers with respect to a content creator for a series of intervals of time. The user interface 500 may be presented on a computing platform associated with the content creator. The user interface 500 may include a grid of cells arranged in attribute-named columns 504 and rows of cells specifying individual values of corresponding attributes named in the attribute-named columns. The attributes may include one or more of name, tier, behavior, join date and/or other attributes. The individual cells may specify the values of the attributes named in the columns 504. By way of non-limiting illustration, subscribers may be "Bob" and "Susan." Cell 505 may include a first sequence of interface elements providing visual representations of the values of the behavior attribute for Bob, and cell 507 may include a second sequence of interface elements providing visual representations of the values of the behavior attribute for Susan. The display of the sequences of interface elements may allow the content creator to quickly discern whether or not the subscribers are at risk of discontinuing subscribership.

Individual interface elements may help to visually convey the measure of likelihood of continued subscribership through configuration of one or more display characteristic that make up the interface elements. For illustrative purposes, FIG. 5 shows different characteristics represented by graphics of a face, including smile, neutral, and frown. Smile may convey high likelihood of continued subscribership. Neutral may convey moderate likelihood of continued subscribership. Frown may convey low likelihood of continued subscribership.

The first sequence in the cell 505 may include one or more of a first interface element 506, a second interface element 508, a third interface element 510, and/or other interface elements. The first interface element 506 may correspond to a first interval of time. The second interface element 508 may correspond to a second interval of time. The third interface element 510 may correspond to a third interval of time. The first sequence may convey to the content creator that, over the prior three intervals of time, Bob's likelihood of continued subscribership is on decline.

The second sequence in the cell 507 may include one or more of a fourth interface element 512, a fifth interface element 514, a sixth interface element 516, and/or other interface elements. The fourth interface element 512 may correspond to the first interval of time. The fifth interface element 514 may correspond to the second interval of time. The sixth interface element 516 may correspond to the third interval of time. The second sequence may convey to the content creator that, over the prior three intervals of time, Susan's likelihood of continued subscribership is steady and positive.

Returning to FIG. 2, in some implementations, server(s) 102, client computing platform(s) 104, and/or external resource(s) 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute one or more computer program components. The computer program components may be configured to enable an expert or user associated with the given client computing platform to interface with system 100, system 10, and/or external resource(s) 126, and/or provide other functionality attributed herein to client computing platform(s) 104. By way of non-limiting example, the given client computing platform may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports, to enable the exchange of information with a network and/or other computing platforms. Illustration of server(s) 102 in FIG. 2 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably communicable with server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a physical processor, a digital processor, an analog processor, a digital circuit designed to process information, an analog circuit designed to process information, a state machine, and/or other mechanisms for electronically processing information. Although processor(s) 130 is shown in FIG. 2 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, and/or 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 2 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 3:
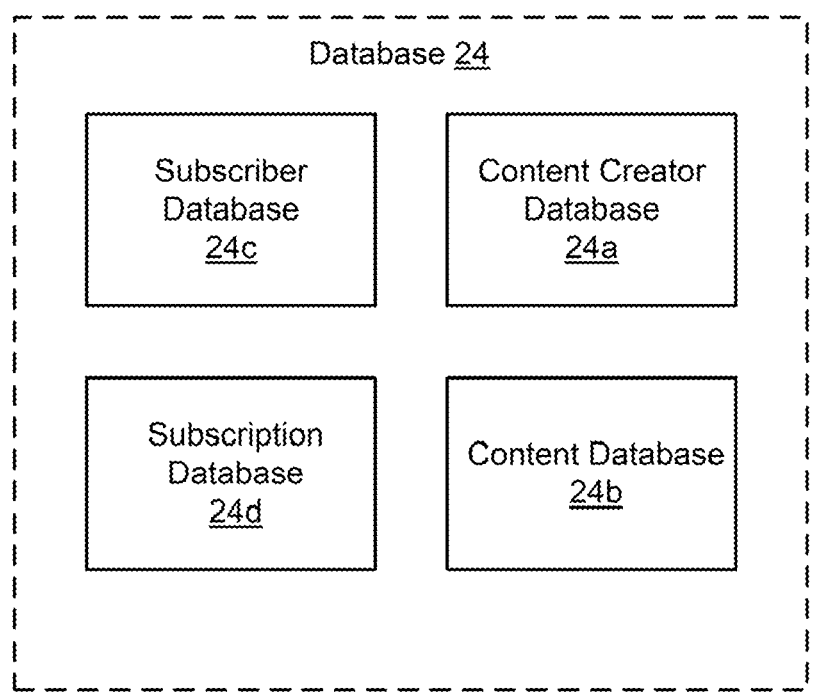
FIG. 3 illustrates an example database.

FIG. 3 illustrates elements that may make up database 24 of FIG. 1. As indicated previously, subscription component 18 of FIG. 1 may transmit information input by content creator 12 and/or consumer 14 regarding content information, subscribership information, and/or other information to database 24. Subscription platform 16, via server 22, for example, may monitor and obtain creation and/or subscribership information for storage in database 24. For example, subscription platform 16 may monitor and store additional information as well as performance-related subscribership information, e.g., engagement activity between content creator 12 and his/her subscribers, one of whom may be consumer 14. For example, subscription platform 16 of FIG. 1 may monitor the amount of money being generated and/or lost through the subscribers (e.g., outcome information), as well as content creator 12's subscriber retention rate. For example, subscription platform 16 may monitor and store performance-related information, such as the amount of content that content creator 12 is creating, how often and/or how quickly content creator 12 reacts to subscriber engagement activity, etc.

Database 24 may include one or more databases or partitions in which information relating to content creator 12, and/or subscribership relevant to content creator 12. For example, database 24 may include a content creator database 24a, a content database 24b, a subscriber database 24c, and a subscription database 24d. It should be noted that the elements and/or functionality of database 24 may be implemented in local memory resident in subscription component 18 or shared between database 24 and the local memory of subscription component 18 rather than solely in database 24.

Database 24 may be populated with one or more of content information, creator profile information, subscriber information, subscribership information, and/or other information.

Creator profile information characterizing content creator may be stored in content creator database 24a. The creator profile information may be information reflecting the creator type that content creator 12 designates him/herself to be and/or other self-identified preferences regarding subscription offerings by content creator 12. For example, content creator type may reflect that content creator may be a paint artist, a digital artist, a sculptor, a video game developer, a writer, a performance artist, etc. Content creator preferences may reflect subscription levels content creator 12 wishes to offer to subscribers. Content creator preferences may reflect, e.g., a desired minimum revenue, preferred sources of revenue, subscription level proportions, etc. For example, content creator preferences may include information indicating content creator's desire for more subscribers pledging some amount of money or less subscribers pledging a greater amount of money. For example, content creator preferences may include information specifying that content creator wishes to supplement his/her subscription-generated revenue with revenue generated from the sale of promotional merchandise.

In addition to content creation-related information, and upon registering with subscription platform as a content creator, content creator may input information characterizing the identity of content creator. For example, content creator may input or upload contact information, a telephone number associated with a personal user device, such as smartphone, an email address, a photograph, and/or other identifying information. Such identifying information may be used by subscription platform in a variety of ways to associate content creator with particular content, his/her webpage, payment of subscription donations, and/or other information.

Consumers may subscribe to content creators by registering with subscription platform. During registration, consumers may input certain subscriber demographic information indicative of economic and/or social characteristics. Subscriber demographic information may reflect the yearly income of consumers, a geographic area in which consumer resides, the age of consumer, interests of consumer, etc. Subscriber information may include data regarding the amount of money consumer is currently pledged to donate to one or more content creators. Over time, as monitored and collected by subscription platform, subscriber information may include information regarding the amount of money consumer has previously donated to one or more content creators. Subscriber information, as monitored and obtained by subscription platform 16 may include an Internet Protocol (IP) address indicative of a current location of consumer 14 and/or an IP address indicating a payment source. Such information may be stored in subscriber database 24c.

Like content creators, consumers may input or upload other identifying information. For example, a photograph or phone number of a consumer may be used. Such information may be stored in subscriber database 24c.

Subscription level information may refer to information characterizing different subscription levels and corresponding preferential access information specified by content creators. For example, subscription level information may reflect that a ten dollar recurring donation is rewarded with a high-resolution digital image of artwork created during that month to consumers. Such subscriber level information may be stored in subscription database 24d. Subscribership information may be stored in subscription database 24d and/or other storage location.

It should be noted that other databases or partitions may make up database 24. For example, database 24 may include one or more databases or partitions for storing information including, but not limited to the following: preferential access information characterizing activity in which content creator engagements may refer to data reflecting the type of activity, the level and/or exclusivity of preferential access to that activity granted to consumer; subscriber and/or content creator engagement information characterizing interactions, the type and/or frequency of interactions between subscribers and content creators, and/or the medium over which interactions may occur; and historical subscription level and/or engagement information reflecting subscription level and/or engagement information monitored and gathered over one or more periods of time.

It should be noted that some of the information described above may not necessarily be required. It should be noted that information reflecting additional aspects of, e.g., the content, content creator, content creator preferences, and/or subscribership, is contemplated by the disclosure. For example, preferential access need not necessarily be offered for each subscription level. For example, subscriber data may include data reflecting particular content creators to which a subscriber pledges donations.

Figure 4:
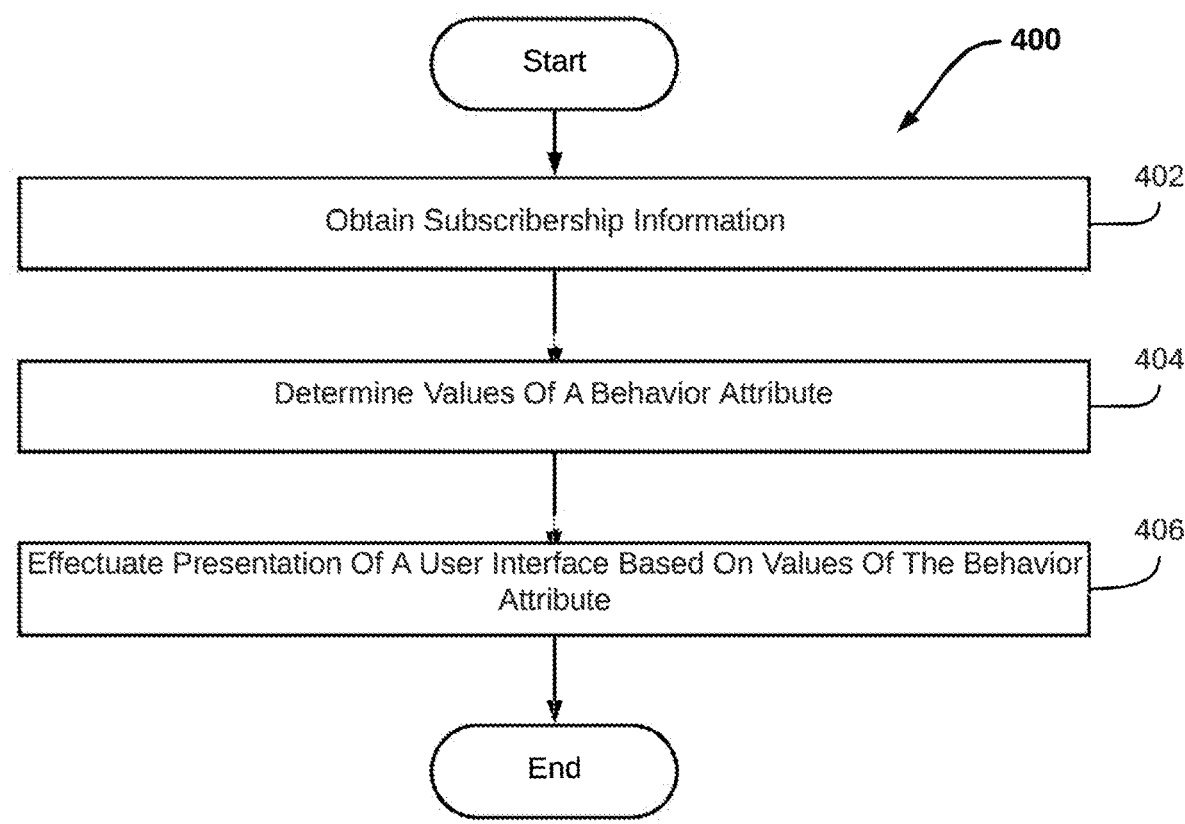
FIG. 4 illustrates a method to generate a user interface conveying subscriber behavior of subscribers within a membership platform, in accordance with one or more implementations.

FIG. 4 illustrates a method 400 to generate a user interface conveying subscriber behavior of subscribers within a membership platform, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a physical processor, digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include obtaining subscribership information for content creators of a membership platform. The content creators may offer subscribership and/or other content. The content creators may provide benefit items to the subscribers in exchange for consideration at periodic intervals of time in accordance with the subscribership offerings. The subscribership information may characterize subscribership of individual ones of the subscribers to individual ones of the content creators for individual ones of the intervals of time. By way of non-limiting illustration, first subscribership information may characterize the subscribership of a first subscriber to a first content creator for individual ones of the intervals of time. Operation 402 may be performed by one or more hardware processors configured by machine-readable instructions including a component that is the same as or similar to information component 108.

An operation 404 may include determining, based on the subscribership information, values of a behavior attribute. The values of the behavior attribute may represent behavior of the individual ones of the subscribers with respect to the individual ones of the content creators for the individual ones of the intervals of time. By way of non-limiting illustration, a first value of the behavior attribute may be determined for the first subscriber. The first value of the behavior attribute may represent the behavior of the first subscriber with respect to the first content creator during a first interval of time. A second value of the behavior attribute may be determined for the first subscriber. The second value of the behavior attribute may represent the behavior of the first subscriber with respect to the first content creator during a second interval of time. Operation 404 may be performed by one or more hardware processors configured by machine-readable instructions including a component that is the same as or similar to behavior component 110.

An operation 406 may include effectuating presentation of a user interface on individual computing platforms associated with the individual ones of the content creators. The presentation of the user interface may be based on the values of the behavior attribute. The user interface may provide visual representations of the behavior of the individual ones of the subscribers with respect to the individual ones of the content creators for the individual ones of the intervals of time. By way of non-limiting illustration, the user interface may be presented on a first computing platform. The first computing platform may be associated with the first content creator. The user interface may display a first visual representation of the behavior of the first subscriber with respect to the first content creator during a first interval of time as represented by the first value. The user interface may display a second visual representation of the behavior of the first subscriber with respect to the first content creator during a second interval of time as represented by the second value. Operation 406 may be performed by one or more hardware processors configured by machine-readable instructions including a component that is the same as or similar to interface component 112.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed:

1. A system configured to monitor consumer activity within an online membership platform and generate a user interface conveying consumer behavior within the online membership platform, the system comprising:
   one or more physical processors configured by machine-readable instructions to:
      manage, by a server, information associated with a content creator of an online membership platform, the content creator providing offerings to consumers at periodic intervals of time, the information characterizing consumption of the offerings by the consumers for individual ones of the intervals of time;
      monitor, by the server, consumer activity within the online membership platform, the consumer activity characterizing engagement by the consumers with offerings, wherein the consumers engage with the offerings through a content creator page associated with the content creator, and the consumers access the content creator page through a user interface of the online membership platform presented via remotely located client computing platforms associated with the consumers;
      update, by the server, the information associated with the content creator based on monitoring the consumer activity;
      determine, by the server and based on the information associated with the content creator, values of a behavior attribute characterizing likelihood of continued engagement by the consumers with the offerings provided by the content creator, an individual value being determined for an individual interval of time, such that a first value of the behavior attribute is determined for a first consumer that represents the likelihood of continued engagement during a first interval of time, and a second value of the behavior attribute is determined for the first consumer that represents the likelihood of continued engagement during a second interval of time;
      train, by the server, a machine learning model based on input/output training information pairs to generate a trained machine learning model, the trained machine learning model being configured to determine impact of different behaviors of the consumers that lead to different likelihoods of continued engagement, the input/output training information pairs including training input information and training output information, the training input information for an individual pair including the values of the behavior attribute for an individual consumer over time, the training output information for the individual pair including indications of whether the individual consumer has engaged with one or more of the offerings;
      determine, based on output of the trained machine learning model comprising determinations of the impact of the different behaviors of the consumers that lead to the different likelihoods of continued engagement, weights that should be applied to the different behaviors when generating the values of the behavior attribute for the consumers;
      update, by the server, the values of the behavior attribute based on the weights;
      effectuate presentation of an account management user interface of the online membership platform on a remotely located client computing platform associated with the content creator, wherein the content creator accesses and manages an account within the online membership platform through the account management user interface, the account management user interface being configured to display, based on the values of the behavior attribute, visual representations of the likelihood of continued engagement by the consumers, such that the account management user interface displays a first visual representation of the likelihood of continued engagement by the first consumer during the first interval of time as represented by the first value, and a second visual representation of the likelihood of continued engagement by the first consumer during the second interval of time as represented by the second value; and
      continuously update the trained machine learning model over time based on ongoing consumer activity within the online membership platform, such that the trained machine learning model is continuously adapted to different consumer activities to improve the determinations of the impact of the different behaviors of the consumers that lead to the different likelihoods of continued engagement.

2. The system of claim 1, wherein the information associated with the content creator includes one or more of a payment status, a payment source status, a cancelation workflow status, or a tier status.

3. The system of claim 2, wherein the information associated with the content creator includes the payment status, the payment status characterizing whether consideration has been paid by individual ones of the consumers for the individual ones of the intervals of time.

4. The system of claim 2, wherein the information associated with the content creator includes the payment source status, the payment source status characterizing whether a source to withdraw monetary funds is accessible.

5. The system of claim 2, wherein the information associated with the content creator includes the cancelation workflow status, the cancelation workflow status characterizing whether individual ones of the consumers have initiated a cancelation of a previously accepted offering.

6. The system of claim 2, wherein the information associated with the content creator includes the tier status, the tier status characterizing tier of engagement with the offerings by the consumers and/or change in the tier of engagement with the offerings by the consumers.

7. The system of claim 1, wherein the account management user interface displays sequences of interface elements as the visual representations of the likelihood of continued engagement over the intervals of time, an individual sequence corresponding to the likelihood of continued engagement by an individual consumer over a set of the intervals of time, individual ones of the interface elements in the sequences corresponding to the individual ones of the intervals of time.

8. The system of claim 7, wherein the one or more physical processors are further configured by the machine-readable instructions to:
determine a display characteristic of the individual ones of the interface elements based on the values of the behavior attribute, such that:
a first interface element has a first display characteristic based on the first value; and
a second interface element has a second display characteristic based on the second value.

9. The system of claim 8, wherein the display characteristic includes one or more of color, size, shape, or indicia.

10. The system of claim 1, wherein the account management user interface includes a grid of cells arranged in attribute-named columns and rows of cells specifying individual values of corresponding attributes named in the attribute-named columns.

11. A method to monitor consumer activity within an online membership platform and generate a user interface conveying consumer behavior within the online membership platform, the method comprising:
managing, by a server, information associated with a content creator of an online membership platform, the content creator providing offerings to consumers at periodic intervals of time, the information characterizing consumption of the offerings by the consumers for individual ones of the intervals of time;
monitoring, by the server, consumer activity within the online membership platform, the consumer activity characterizing engagement by the consumers with offerings, wherein the consumers engage with the offerings through a content creator page associated with the content creator, and the consumers access the content creator page through a user interface of the online membership platform presented via remotely located client computing platforms associated with the consumers;
updating, by the server, the information associated with the content creator based on the monitoring the consumer activity;
determining, by the server and based on the information associated with the content creator, values of a behavior attribute characterizing likelihood of continued engagement by the consumers with the offerings provided by the content creator, an individual value being determined for an individual interval of time, including determining a first value of the behavior attribute for a first consumer that represents the likelihood of continued engagement during a first interval of time, and determining a second value of the behavior attribute for the first consumer that represents the likelihood of continued engagement during a second interval of time;
training, by the server, a machine learning model based on input/output training information pairs to generate a trained machine learning model, the trained machine learning model being configured to determine impact of different behaviors of the consumers that lead to different likelihoods of continued engagement, the input/output training information pairs including training input information and training output information, the training input information for an individual pair including the values of the behavior attribute for an individual consumer over time, the training output information for the individual pair including indications of whether the individual consumer has engaged with one or more of the offerings;
determining, based on output of the trained machine learning model comprising determinations of the impact of the different behaviors of the consumers that lead to the different likelihoods of continued engagement, weights that should be applied to the different behaviors when generating the values of the behavior attribute for the consumers;
updating, by the server, the values of the behavior attribute based on the weights;
effectuating presentation of an account management user interface of the online membership platform on a remotely located client computing platform associated with the content creator, wherein the content creator accesses and manages an account within the online membership platform through the account management user interface, the account management user interface being configured to display, based on the values of the behavior attribute, visual representations of the likelihood of continued engagement by the consumers, the account management user interface displaying a first visual representation of the likelihood of continued engagement by the first consumer during the first interval of time as represented by the first value, and displaying a second visual representation of the likelihood of continued engagement by the first consumer during the second interval of time as represented by the second value; and
continuously updating the trained machine learning model over time based on ongoing consumer activity within the online membership platform, such that the trained machine learning model is continuously adapted to different consumer activities to improve the determinations of the impact of the different behaviors of the consumers that lead to the different likelihoods of continued engagement.

12. The method of claim 11, wherein the information associated with the content creator includes one or more of a payment status, a payment source status, a cancelation workflow status, or a tier status.

13. The method of claim 12, wherein the information associated with the content creator includes the payment status, the payment status characterizing whether consideration has been paid by individual ones of the consumers for the individual ones of the intervals of time.

14. The method of claim 12, wherein the information associated with the content creator includes the payment source status, the payment source status characterizing whether a source to withdraw monetary funds is accessible.

15. The method of claim 12, wherein the information associated with the content creator includes the cancelation workflow status, the cancelation workflow status characterizing whether individual ones of the consumers have initiated a cancelation of a previously accepted offering.

16. The method of claim 12, wherein the information associated with the content creator includes the tier status, the tier status characterizing tier of engagement with the offerings by the consumers and/or change in the tier of engagement with the offerings by the consumers.

17. The method of claim 11, wherein the account management user interface displays sequences of interface elements as the visual representations of the likelihood of continued engagement over the intervals of time, an individual sequence corresponding to the likelihood of continued engagement by an individual consumer over a set of the intervals of time, individual ones of the interface elements in the sequences corresponding to the individual ones of the intervals of time.

18. The method of claim 17, further comprising:
determining a display characteristic of the individual ones of the interface elements based on the values of the behavior attribute, including determining:
a first interface element has a first display characteristic based on the first value; and
a second interface element has a second display characteristic based on the second value.

19. The method of claim 18, wherein the display characteristic includes one or more of color, size, shape, or indicia.

20. The method of claim 11, wherein the account management user interface includes a grid of cells arranged in attribute-named columns and rows of cells specifying individual values of corresponding attributes named in the attribute-named columns.

* * * * *